(12) United States Patent
Vogel

(10) Patent No.: US 11,822,140 B2
(45) Date of Patent: *Nov. 21, 2023

(54) HIGH DENSITY PATCH PANEL WITH MODULAR CASSETTES

(71) Applicant: AFL Telecommunications LLC, Duncan, SC (US)

(72) Inventor: Mark A. Vogel, Greenville, SC (US)

(73) Assignee: AFL Telecommunications LLC, Duncan, SC (US)

(*) Notice: Subject to any disclaimer, the term of this patent is extended or adjusted under 35 U.S.C. 154(b) by 42 days.

This patent is subject to a terminal disclaimer.

(21) Appl. No.: 17/497,577

(22) Filed: Oct. 8, 2021

(65) Prior Publication Data

US 2022/0026654 A1 Jan. 27, 2022

Related U.S. Application Data

(63) Continuation of application No. 16/810,348, filed on Mar. 5, 2020, now Pat. No. 11,169,347, which is a continuation of application No. 15/971,477, filed on May 4, 2018, now Pat. No. 10,670,822.

(60) Provisional application No. 62/590,823, filed on Nov. 27, 2017, provisional application No. 62/525,791, filed on Jun. 28, 2017.

(51) Int. Cl.
*G02B 6/44* (2006.01)
*H04Q 1/02* (2006.01)

(52) U.S. Cl.
CPC ......... *G02B 6/4455* (2013.01); *G02B 6/4452* (2013.01); *H04Q 1/13* (2013.01)

(58) Field of Classification Search
CPC ....... G02B 6/4455; G02B 6/4452; H04Q 1/13
USPC ......................................................... 385/135
See application file for complete search history.

(56) References Cited

U.S. PATENT DOCUMENTS

| | | | |
|---|---|---|---|
| 5,339,379 | A | 8/1994 | Kutsch et al. |
| 5,490,229 | A | 2/1996 | Ghandeharizadeh et al. |
| 5,701,380 | A | 12/1997 | Larson et al. |
| 5,754,723 | A | 5/1998 | Fremgen |
| 5,966,492 | A | 10/1999 | Bechamps et al. |
| 5,978,540 | A | 11/1999 | Bechamps et al. |
| 6,215,938 | B1 | 4/2001 | Reitmeier et al. |
| 6,456,773 | B1 | 9/2002 | Keys |
| 6,499,609 | B2 | 12/2002 | Patriche et al. |
| 6,647,197 | B1 | 11/2003 | Marrs et al. |

(Continued)

FOREIGN PATENT DOCUMENTS

| | | |
|---|---|---|
| AU | 2015227494 A1 | 10/2015 |
| AU | 2017204601 A1 | 7/2017 |

(Continued)

OTHER PUBLICATIONS

AFL Telecommunications LLC; International Patent Application No. PCT/US2018/037270; Partial International Search Report; dated Sep. 13, 2018; (2 pages).

*Primary Examiner* — Jerry M Blevins
(74) *Attorney, Agent, or Firm* — Dority & Manning, P.A.

(57) ABSTRACT

A patch panel may include a tray that is slidable between a retracted position and an extended position on tray supports and features for holding the tray in the retracted position and in the extended position. The patch panel may also include a cassette that is slidable on cassette supports, latches for engaging the cassette to block movement of the cassette and features for disengaging the latches.

20 Claims, 15 Drawing Sheets

(56) References Cited

U.S. PATENT DOCUMENTS

| | | |
|---|---|---|
| 6,677,520 B1 | 1/2004 | Kim et al. |
| 6,768,860 B2 | 7/2004 | Liberty |
| 6,792,190 B2 | 9/2004 | Xin et al. |
| 6,944,387 B2 | 9/2005 | Howell et al. |
| 6,944,389 B2 | 9/2005 | Giraud et al. |
| 7,391,952 B1 | 6/2008 | Ugolini et al. |
| 7,428,363 B2 | 9/2008 | Leon et al. |
| 7,509,015 B2 | 3/2009 | Murano |
| 7,689,089 B2 | 3/2010 | Wagner et al. |
| 7,697,811 B2 | 4/2010 | Murano et al. |
| 7,711,233 B2 | 5/2010 | MaHoney |
| 7,856,166 B2 | 12/2010 | Biribuze et al. |
| 7,889,961 B2 | 2/2011 | Cote et al. |
| 7,945,135 B2 | 5/2011 | Cooke et al. |
| 7,962,000 B2 | 6/2011 | Wagner et al. |
| 7,974,509 B2 | 7/2011 | Smith et al. |
| 8,184,938 B2 | 5/2012 | Cooke et al. |
| 8,208,781 B1 | 6/2012 | Morgan et al. |
| 8,229,268 B2 | 7/2012 | Krampotich et al. |
| 8,249,410 B2 | 8/2012 | Andrus et al. |
| 8,280,216 B2 | 10/2012 | Cooke et al. |
| 8,326,107 B2 | 12/2012 | Cooke et al. |
| 8,331,752 B2 | 12/2012 | Biribuze et al. |
| 8,346,046 B2 | 1/2013 | Wagner et al. |
| 8,385,710 B2 | 2/2013 | Wong et al. |
| 8,385,711 B2 | 2/2013 | Fabrykowski et al. |
| 8,433,063 B2 | 4/2013 | Murano et al. |
| 8,433,171 B2 | 4/2013 | Cooke et al. |
| 8,452,148 B2 | 5/2013 | Cooke et al. |
| 8,538,226 B2 | 9/2013 | Makrides-Saravanos et al. |
| 8,625,950 B2 | 1/2014 | Beamon et al. |
| 8,666,217 B2 | 3/2014 | Wong et al. |
| 8,705,926 B2 | 4/2014 | Giraud et al. |
| 8,712,206 B2 | 4/2014 | Cooke et al. |
| 8,814,445 B2 | 8/2014 | Gallegos et al. |
| 8,861,918 B2 | 10/2014 | Vazquez et al. |
| 8,879,882 B2 | 11/2014 | Conner et al. |
| 8,965,168 B2 | 2/2015 | Cowen et al. |
| 8,995,136 B2 | 3/2015 | Kostecka et al. |
| 9,002,166 B2 | 4/2015 | Solheid et al. |
| 9,020,319 B2 | 4/2015 | Anderson et al. |
| 9,020,320 B2 | 4/2015 | Cooke et al. |
| 9,075,217 B2 | 7/2015 | Giraud et al. |
| 9,116,324 B2 | 8/2015 | Cooke et al. |
| 9,167,897 B2 | 10/2015 | Barnes et al. |
| 9,182,563 B2 | 11/2015 | Badar et al. |
| 9,223,105 B2 | 12/2015 | Anderson et al. |
| 9,236,691 B2 | 1/2016 | Bragg |
| 9,250,409 B2 | 2/2016 | Blackwell, Jr. et al. |
| 9,280,216 B2 | 3/2016 | Chen |
| 9,372,318 B2 | 6/2016 | Veatch et al. |
| 9,385,710 B2 | 7/2016 | Yang et al. |
| 9,423,585 B2 | 8/2016 | Timmins et al. |
| 9,435,975 B2 | 9/2016 | Ott |
| 9,442,265 B2 | 9/2016 | Hill et al. |
| 9,442,267 B2 | 9/2016 | Douglas et al. |
| 9,494,758 B2 | 11/2016 | Holmberg et al. |
| 9,516,781 B2 | 12/2016 | Ray |
| 9,519,118 B2 | 12/2016 | Veatch et al. |
| 9,523,833 B2 | 12/2016 | Campbell et al. |
| 9,532,482 B2 | 12/2016 | Anderson et al. |
| 9,541,725 B2 | 1/2017 | Holmberg et al. |
| 9,541,726 B2 | 1/2017 | Geens et al. |
| 9,568,699 B2 | 2/2017 | Geens et al. |
| 9,575,275 B2 | 2/2017 | Blackwell, Jr. et al. |
| 9,575,276 B2 | 2/2017 | Ruiz |
| 9,599,785 B2 | 3/2017 | Xu et al. |
| 9,625,668 B2 | 4/2017 | Xu et al. |
| 9,632,270 B2 | 4/2017 | Giraud et al. |
| 9,664,870 B2 | 5/2017 | Trebesch et al. |
| 9,664,871 B1 | 5/2017 | Mijangos et al. |
| 9,666,999 B2 | 5/2017 | Seo et al. |
| 9,678,295 B2 | 6/2017 | Giraud et al. |
| 9,678,296 B2 | 6/2017 | Krampotich et al. |
| 9,684,143 B2 | 6/2017 | Chen et al. |
| 9,690,064 B2 | 6/2017 | Sauter et al. |
| 9,690,065 B2 | 6/2017 | Wiltjer et al. |
| 9,709,764 B2 | 7/2017 | Smrha et al. |
| 9,709,765 B2 | 7/2017 | Wells et al. |
| 9,715,075 B2 | 7/2017 | Solheid et al. |
| 9,720,196 B2 | 8/2017 | Womack |
| 9,720,199 B2 | 8/2017 | Mead |
| 9,910,236 B2 | 3/2018 | Cooke et al. |
| 10,670,822 B2 | 6/2020 | Vogel |
| 11,169,347 B2 * | 11/2021 | Vogel .................. G02B 6/4452 |
| 2005/0025444 A1 | 2/2005 | Barnes |
| 2005/0201073 A1 | 9/2005 | Pincu |
| 2011/0228473 A1 | 9/2011 | Anderson |
| 2012/0288249 A1 | 11/2012 | Ruiz |
| 2013/0163944 A1 | 6/2013 | Krampotich |
| 2014/0348467 A1 | 11/2014 | Cote et al. |
| 2014/0354131 A1 | 12/2014 | Takeuchi |
| 2015/0185429 A1 | 7/2015 | Cooke et al. |
| 2015/0212286 A1 | 7/2015 | Vongseng et al. |
| 2015/0257295 A1 * | 9/2015 | Lu .......................... H04Q 1/021 |
| | | 312/223.2 |
| 2015/0268435 A1 | 9/2015 | Blackwell, Jr. et al. |
| 2015/0316737 A1 | 11/2015 | McPhil et al. |
| 2016/0033732 A1 | 2/2016 | Giraud et al. |
| 2016/0062058 A1 | 3/2016 | Dagley |
| 2016/0109672 A1 | 4/2016 | Green et al. |
| 2016/0147029 A1 | 5/2016 | Blackwell, Jr. et al. |
| 2016/0231525 A1 | 8/2016 | Murray et al. |
| 2016/0259129 A1 | 9/2016 | Green et al. |
| 2016/0299308 A1 | 10/2016 | Wiltjer et al. |
| 2016/0313525 A1 | 10/2016 | Fletcher et al. |
| 2013/0308916 A1 | 11/2016 | Buff et al. |
| 2017/0082815 A1 | 3/2017 | Takeuchi et al. |
| 2017/0090138 A1 | 3/2017 | Giraud et al. |
| 2017/0131500 A1 * | 5/2017 | Sauter ................. G02B 6/4452 |
| 2017/0131501 A1 | 5/2017 | Solheid et al. |
| 2017/0131504 A1 | 5/2017 | Cooke et al. |
| 2017/0131505 A1 | 5/2017 | Cooke et al. |
| 2017/0131506 A1 | 5/2017 | Cooke et al. |
| 2017/0131508 A1 | 5/2017 | Cooke et al. |
| 2017/0153399 A1 | 6/2017 | Rodriguez |
| 2017/0153406 A1 | 6/2017 | Rodriguez |
| 2017/0160505 A1 | 6/2017 | Cooke et al. |
| 2017/0192191 A1 | 7/2017 | Dagley et al. |
| 2017/0235073 A1 | 8/2017 | Ott et al. |
| 2017/0269318 A1 | 9/2017 | Giraud et al. |
| 2017/0315320 A1 | 11/2017 | Wells et al. |
| 2017/0315321 A1 | 11/2017 | Wells et al. |
| 2018/0003912 A1 | 1/2018 | Sedor et al. |
| 2018/0199117 A1 | 7/2018 | Mankinen |
| 2018/0224621 A1 | 8/2018 | Campbell |

FOREIGN PATENT DOCUMENTS

| | | |
|---|---|---|
| CN | 101881870 B | 11/2011 |
| CN | 202676965 U | 1/2013 |
| CN | 204595292 U | 8/2015 |
| CN | 204903799 U | 12/2015 |
| CN | 205049782 U | 2/2016 |
| CN | 103777294 B | 5/2016 |
| CN | 205720798 U | 11/2016 |
| CN | 106199885 A | 12/2016 |
| CN | 205982753 U | 2/2017 |
| EP | 645657 B1 | 1/2000 |
| EP | 2318871 A2 | 5/2011 |
| EP | 2995981 A2 | 3/2016 |
| EP | 3001229 A1 | 3/2016 |
| EP | 2335108 B1 | 11/2016 |
| EP | 3104205 A2 | 12/2016 |
| JP | 3815606 B2 | 8/2006 |
| JP | 4039673 B2 | 1/2008 |
| JP | 4786294 B2 | 10/2011 |
| TW | M372950 U | 1/2010 |
| WO | WO2011137350 A1 | 11/2011 |
| WO | WO2012052332 A1 | 4/2012 |
| WO | WO2013120270 A1 | 8/2013 |
| WO | WO2014009344 A1 | 1/2014 |
| WO | WO2016012550 A2 | 1/2016 |
| WO | WO2016142715 A1 | 9/2016 |

(56) References Cited

FOREIGN PATENT DOCUMENTS

| | | |
|---|---|---|
| WO | WO2016154092 A1 | 9/2016 |
| WO | WO2016156611 A1 | 10/2016 |
| WO | WO2016168337 A1 | 10/2016 |
| WO | WO2017021116 A1 | 2/2017 |
| WO | WO2017103197 A1 | 6/2017 |
| WO | WO2017103234 A1 | 6/2017 |

* cited by examiner

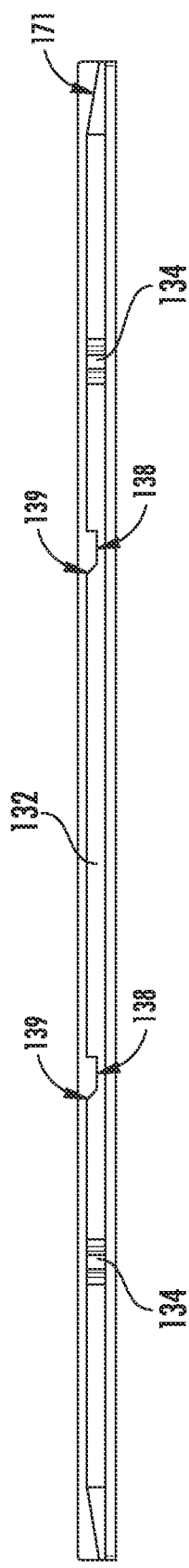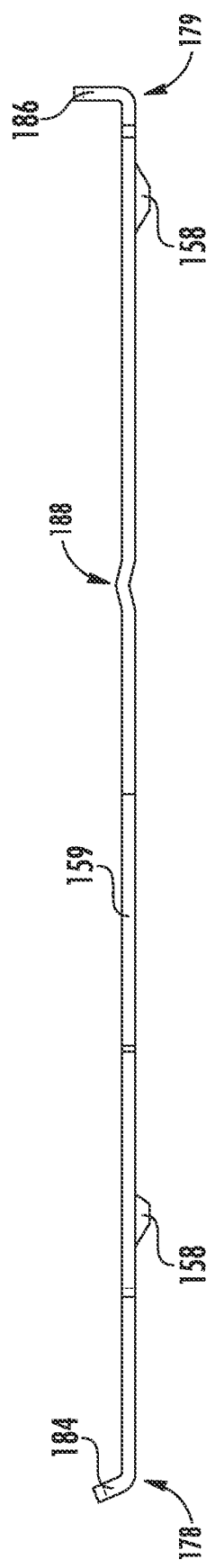

HIGH DENSITY PATCH PANEL WITH MODULAR CASSETTES

CROSS-REFERENCE TO RELATED APPLICATION

This application is a continuation of U.S. patent application Ser. No. 16/810,348, filed on Mar. 5, 2020, which is a continuation of U.S. patent application Ser. No. 15/971,477, filed on May 4, 2018, which claims the benefit of priority to U.S. Provisional Patent Application No. 62/590,823, filed on Nov. 27, 2017 and U.S. Provisional Patent Application No. 62/525,791, filed on Jun. 28, 2017, the disclosures of all of which are incorporated by reference herein in their entireties.

FIELD OF THE INVENTION

The present subject matter relates generally to high density fiber optic patch panels or enclosures for pre-terminated cassette modules.

BACKGROUND OF THE INVENTION

Large data centers frequently deploy rows of racks and/or cabinets for cross-connect applications. The installation of high density fiber optic patch panels has been simplified and made more reliable by utilizing pre-terminated cassette modules installed in rack-mount enclosures. Although these pre-terminated cassettes have addressed many installation issues in terms of eliminating the need for field termination and polishing, they've introduced others. In particular, there are certain applications that require installation/maintenance from the rear side of the enclosure and others that lend to front-side installation/maintenance. Many enclosures in the market only allow either front side or rear side installation/maintenance; and, while there are a few solutions in the market that do allow for front and rear side access, the removal of the cassette module can be cumbersome requiring two-handed manipulation in tight quarters.

In addition, space constraints (particularly in the 1RU enclosure version) have traditionally required the use of flat head screws and countersinks to attach cassette rails which add weight and assembly time.

BRIEF DESCRIPTION OF THE INVENTION

The present subject matter provides a patch panel. The patch panel may include a tray that is slidable between a retracted position and an extended position on the tray supports and features for holding the tray in the retracted position and in the extended position. The patch panel may also include a cassette that is slidable on cassette supports, latches for engaging the cassette to block movement of the cassette and features for disengaging the latches. Additional aspects and advantages of the invention will be set forth in part in the following description, or may be apparent from the description, or may be learned through practice of the invention.

In a first example embodiment, a patch panel defines a lateral direction, a transverse direction and a vertical direction that are mutually perpendicular, the patch panel includes a first tray support and a second tray support. The first tray support has a pair of slide rails that are spaced along the vertical direction. The first tray support defines a first detent and a second detent that are spaced along the transverse direction and are positioned between the pair of slide rails of the first tray support along the vertical direction. The second tray support has a pair of slide rails that are spaced along the vertical direction. The second tray support defines a first detent and a second detent that are spaced along the transverse direction and are positioned between the pair of slide rails of the second tray support along the vertical direction. The second tray support is spaced from the first tray support along the lateral direction. A tray has a plurality of cassette mounting bays. The tray has a first pair of detent followers and a second pair of detent followers. The detent followers of the first pair of detent followers are spaced along the transverse direction and are positioned at a first side portion of the tray. The detent followers of the second pair of detent followers are spaced along the transverse direction and are positioned at a second side portion of the tray. The first side portion of the tray is receivable between the pair of slide rails of the first tray support and the second side portion of the tray is receivable between the pair of slide rails of the second tray support such that the tray is slidable along the transverse direction between a retracted position and an extended position on the first and second tray supports. One of the first pair of detent followers is received within the first detent of the first tray support and one of the second pair of detent followers is received within the first detent of the second tray support in the extended position of the tray. Each of the first pair of detent followers is received within a respective one of the first and second detents of the first tray support and each of the second pair of detent followers is received within a respective one of the first and second detents of the second tray support in the retracted position of the tray.

In a second example embodiment, a patch panel defines a lateral direction, a transverse direction and a vertical direction that are mutually perpendicular. The patch panel includes a tray that has a plurality of cassette mounting bays. The tray includes a first cassette support and a second cassette support. The first and second cassette supports are positioned at opposite sides of one of the plurality of cassette mounting bays along the lateral direction. The first cassette support has a first latch and a second latch that are each positioned at an opposite respective end portion of the first cassette support along the transverse direction. A cassette has a release slide positioned at a first side portion of the cassette. The release slide has a first ramp and a second ramp that are each positioned at an opposite respective end portion of the release slide along the transverse direction. The release slide is movable between a neutral position and a release position. The first side portion of the cassette is receivable by the first cassette support and a second side portion of the tray is receivable by the second cassette support such that the cassette is slidable along the transverse direction on the first and second cassette supports. The first and second latches engage the cassette when the cassette is positioned within the one of the plurality of cassette mounting bays and the release slide is in the neutral position. The first ramp disengages the first latch from the cassette and the second ramp disengages the second latch from the cassette when the cassette is positioned within the one of the plurality of cassette mounting bays and the release slide is in the release position.

In a third example embodiment, a patch panel defines a lateral direction, a transverse direction and a vertical direction that are mutually perpendicular. The patch panel includes a tray having a plurality of cassette mounting bays. The tray includes a first cassette support and a second cassette support. The first and second cassette supports are positioned at opposite sides of one of the plurality of cassette mounting bays along the lateral direction. The first cassette support has a first latch and a second latch that are each positioned at an opposite respective end portion of the first cassette support along the transverse direction. A cassette extends between a first side portion and a second side portion along the lateral direction. The first side portion of the cassette is receivable by the first cassette support and the second side portion of the tray is receivable by the second cassette support such that the cassette is slidable along the transverse direction on the first and second cassette supports. The first and second latches are configured to engage the cassette such that the first and second latches block movement of the cassette along the transverse direction when the cassette is positioned within the one of the plurality of cassette mounting bays. The cassette includes means for simultaneously disengaging the first and second latches from the cassette when the cassette is positioned within the one of the plurality of cassette mounting bays such that the cassette is slidable from the one of the plurality of cassette mounting bays at both a front and a back of the tray.

In a fourth example embodiment, a cassette defines a lateral direction and a transverse direction that are perpendicular. The cassette includes a cassette body that extends between a first side portion and a second side portion along the lateral direction and between a front portion and a rear portion along the transverse direction. The cassette body defines a release slide slot at the first side portion of the cassette body. The release slide slot extends longitudinally between the front and rear portions of the cassette body along the transverse direction. A release slide is positioned within the release slide slot at the first side portion of the cassette body. The release slide is movable between a neutral position and a release position along the transverse direction within the release slide slot. The release slide extends between a first end portion and a second end portion along the transverse direction. The release slide has a first ramp and a second ramp. The first ramp is positioned proximate the first end portion of the release slide, and the second ramp is positioned proximate the second end portion of the release slide.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 15 is a side, elevation view of a slide of the tray of FIG. 3.

FIG. 16 is top, plan view of a

DETAILED DESCRIPTION

Figure 1:
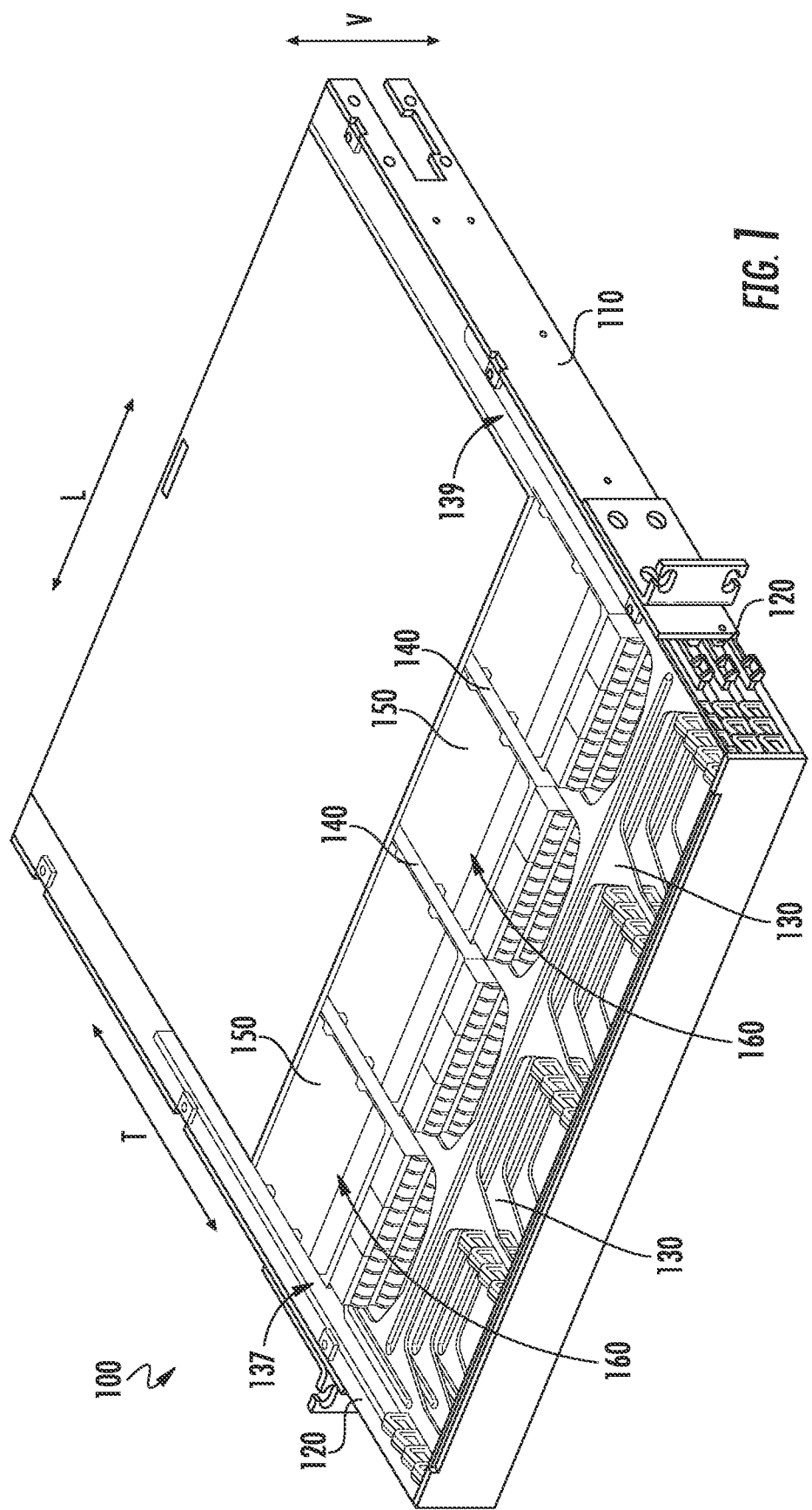
FIG. 1 is a perspective view of a patch panel according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a patch panel 100 according to an example embodiment of the present subject matter. One of ordinary skill in the art may also refer to patch panel 100 as a "patch enclosure." As may be seen in FIG. 1, patch panel 100 includes an enclosure 110, a pair of tray supports 120, a plurality of trays 130, a plurality of cassette supports 140 and a plurality of cassettes 150. Patch panel 100 may be generally referred to as a "rackmount high density connectivity platform." Cassettes 150 may be modular and suitable for patch, patch & splice, wavelength-division-multiplexing (WDM), and splitter applications. Thus, e.g., each cassette 150 may include connectors (such as LC connectors, MPO connecters, etc.) at a front and a rear of the cassette 150, and fibers within the cassette 150 may extend between the various connectors at the front and rear of the cassette 150. As discussed in greater detail below, patch panel 100 includes features for regulating movement of trays 130 on tray supports 120 and/or features for regulating movement of cassettes 150 on cassette supports 140. Such features may facilitate access to cassettes 150 and thereby assist a user with connecting optical fibers to cassettes 150. Cassettes 150 include ports at a front and rear of cassettes 150 and optical fibers within cassettes 150 connect the ports at front and rear of cassettes 150.

Figure 2:
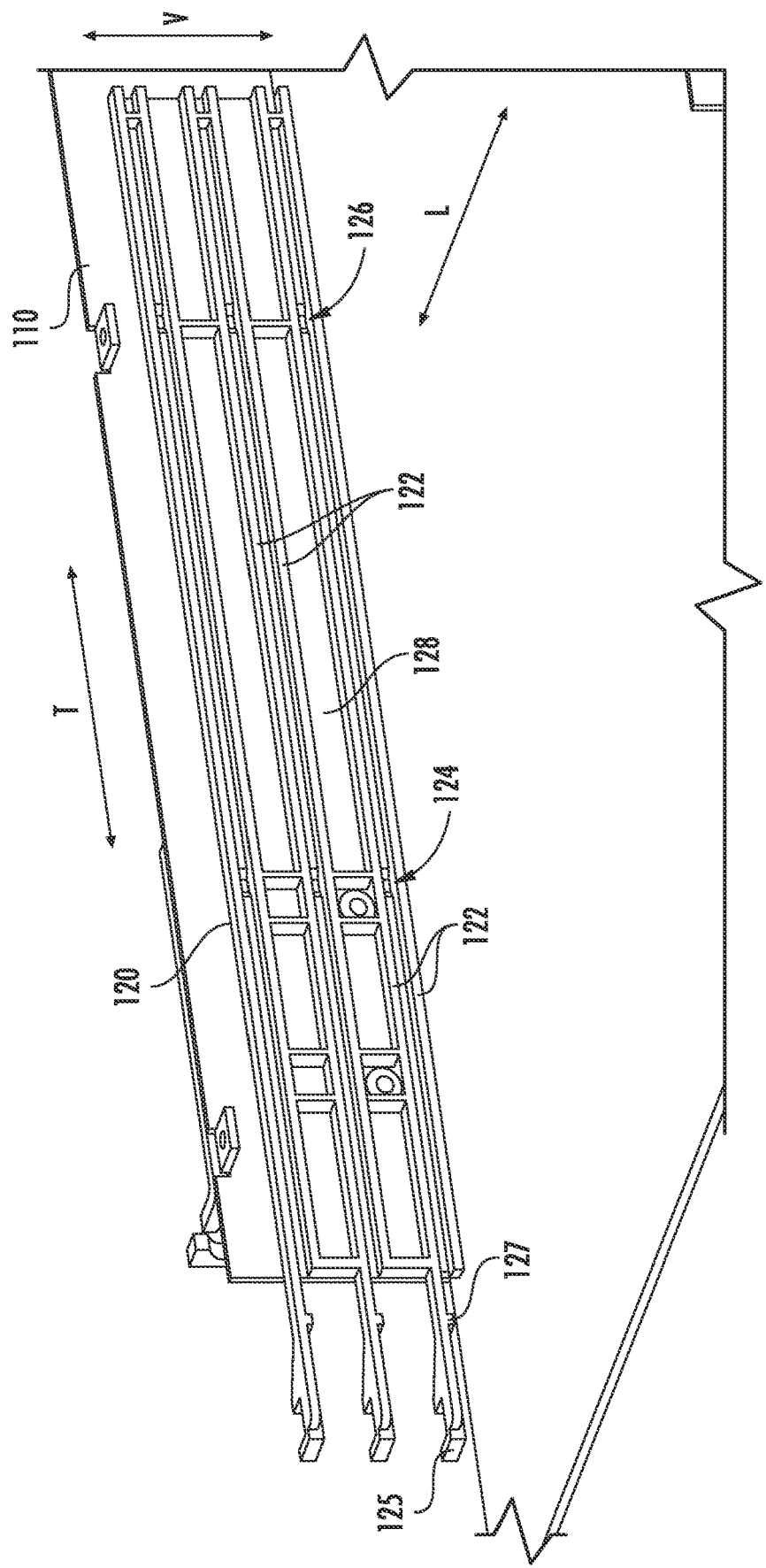
FIG. 2 is a perspective view of a tray support of the example patch panel of FIG. 1.
Figure 3:
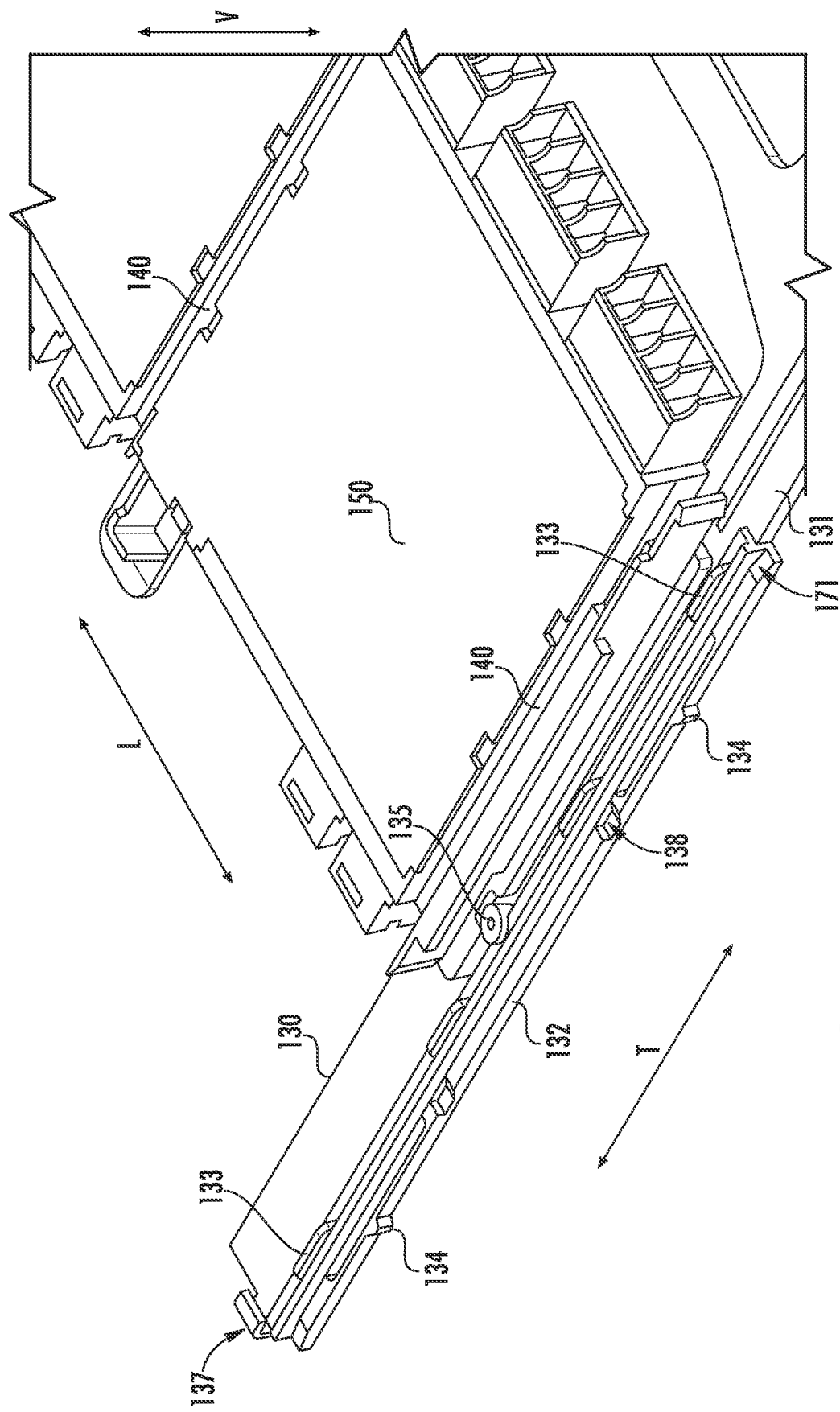
FIG. 3 is a perspective view of a tray of the example patch panel of FIG. 1.

Patch panel 100 defines a vertical direction V, a lateral direction L and a transverse direction T. The vertical, lateral and transverse directions V, L, T are mutually perpendicular and form an orthogonal direction system. Trays 130 may be mounted on tray supports 120 within enclosure 110 such that trays 130 are slidable relative to tray supports 120 along the transverse direction T. Similarly, cassettes 150 may be mounted on cassette supports 140 within enclosure 110 such that cassettes 150 are slidable relative to cassette supports 140 and/or tray 130 along the transverse direction T FIG. 2 is a perspective view of one of tray supports 120, and FIG. 3 is a perspective view of one of trays 130. In FIG. 2, only one of tray supports 120 is shown. It will be understood that patch panel 100 may also include another tray support at an opposite side of enclosure 110 along the lateral direction L, and the other tray support may be formed in the same or similar manner to tray support 120 shown in FIG. 2. Thus, patch panel 100 may include two tray supports 120 at opposite sides of enclosure 110 along the lateral direction L. Tray supports 120 may also be staked along the vertical direction V to form a 2RU panel/enclosure, a 3RU panel/enclosure, etc. Tray supports 120 may be mounted to enclosure 110 with adhesive, tape and/or fasteners. In particular, a tray support base 128 of tray support 120 may be adhered, taped and/or fastened to enclosure 110.

Tray support 120 has a pair of slide rails 122. Slide rails 122 may be mounted to or formed with tray support base 128 such that slide rails 122 extend from tray support base 128, e.g., along the lateral direction L. Slide rails 122 are spaced apart from each other along the vertical direction V. In particular, slide rails 122 may be spaced apart along the vertical direction V such that tray 130 is slideable between slide rails 122. Thus, slide rails 122 may support tray 130 such that tray 130 is movable relative to enclosure 110 on tray supports 120. As shown in FIG. 2, tray support 120 may include multiple pairs of slide rails 122 such that multiple trays 130 may be mounted to tray support 120. Thus, while discussed in greater detail below in the context of a single pair of slide rails 122 and one tray 130, multiple trays 130 may be mounted to tray support 120 in example embodiments.

Tray support 120 also defines a first detent 124 and a second detent 126. First and second detents 124, 126 may formed in tray support base 128 such that first and second detents 124, 126 extend into or through tray support base 128, e.g., along the lateral direction L. First and second detents 124, 126 are spaced apart from each other, e.g., along the transverse direction T. In addition, first and second detents 124, 126 may be positioned between slide rails 122, e.g., along the vertical direction V.

Turning now to FIG. 3, tray 130 includes a slide 132 with a pair of detent followers 134. Only one side of tray 130 is shown in FIG. 3. It will be understood that tray 130 may also include another slide at an opposite side of tray 130 along the lateral direction L, and the other slide may be formed in the same or similar manner to slide 132 shown in FIG. 3. Thus, tray 130 may include two slides 132 at opposite sides of tray 130 along the lateral direction L. In particular, tray 130 may extend between a first side portion 137 and a second side portion 139 along the lateral direction L. One of slides 132 may be mounted to tray body 131 at first side portion 137 of tray body 131, and the other of slides 132 may be mounted to tray body 131 at second side portion 139 of tray body 131. Slides 132 may be mounted to a tray body 131 with mounting tabs 133 formed with tray body 131 and/or a fastener 135 that extends through tray body 131 and slide 132.

Figure 4:
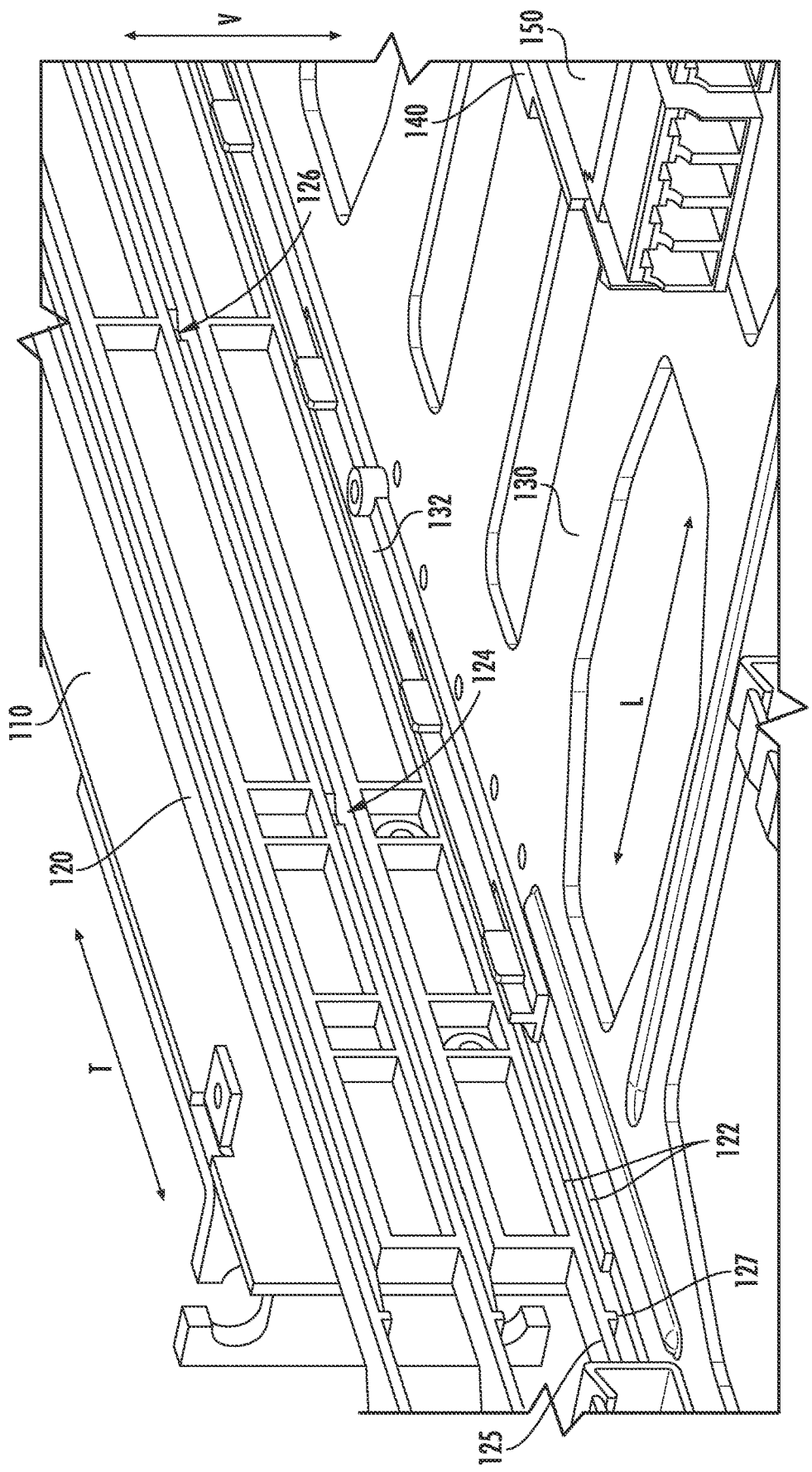
FIG. 4 is a perspective view of the tray support of FIG. 2 and the tray of FIG. 3 with the tray shown in a retracted position.
Figure 5:
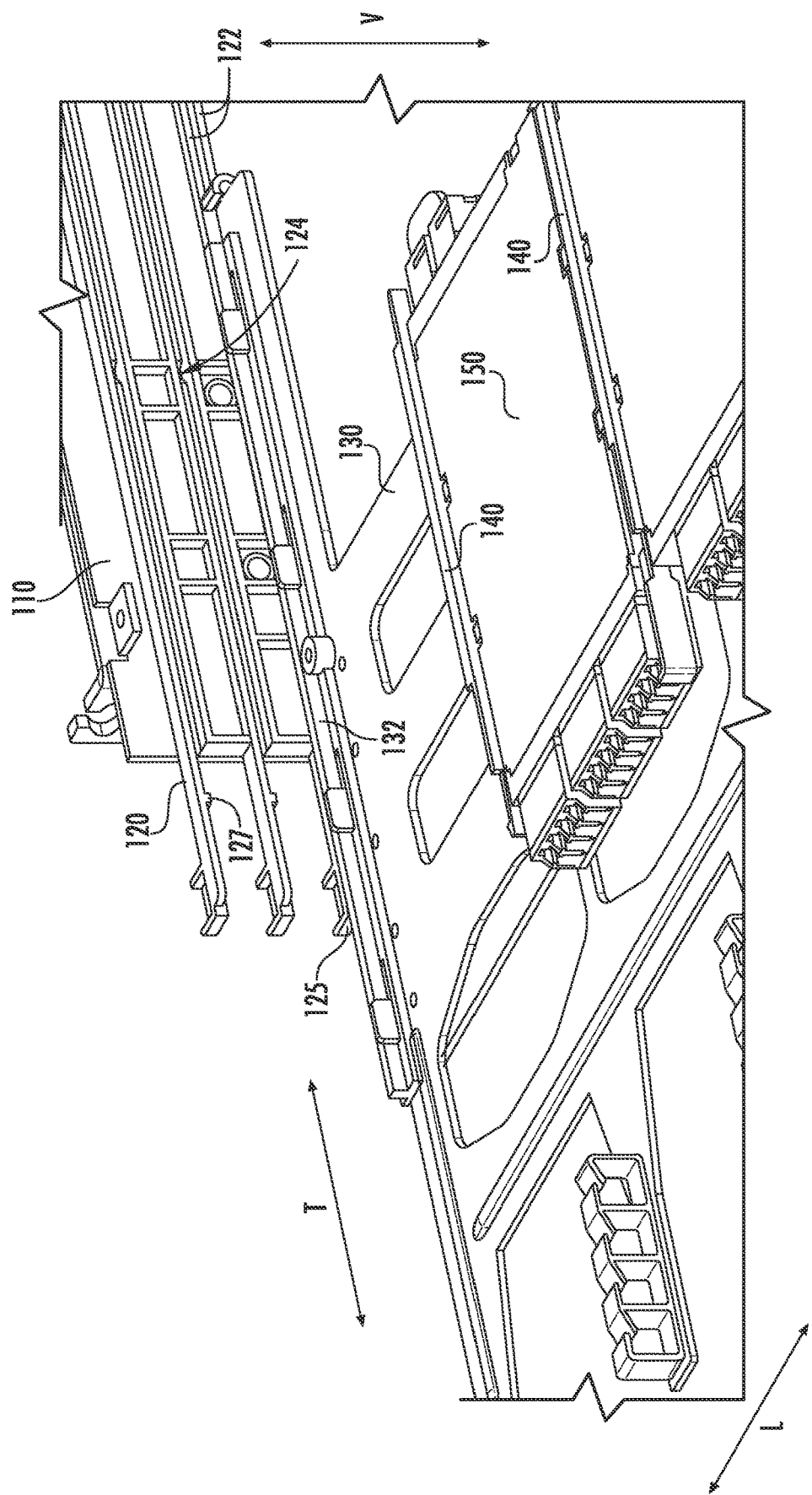
FIG. 5 is a perspective view of the tray support of FIG. 2 and the tray of FIG. 3 with the tray shown in an extended position.
Figure 6:
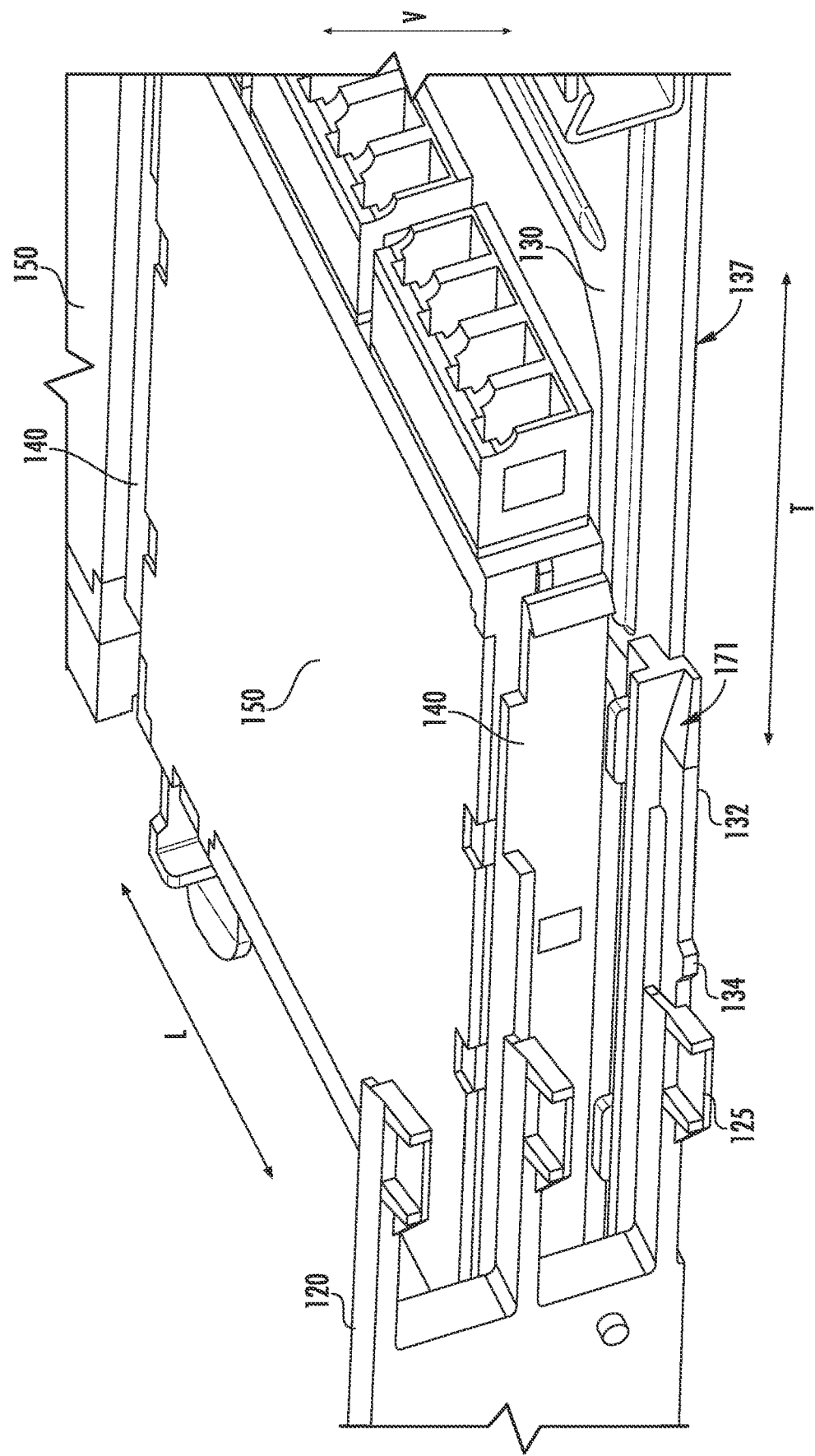
FIGS. 6 and 7 are other perspective views of the tray support and tray of FIG. 5.
Figure 7:
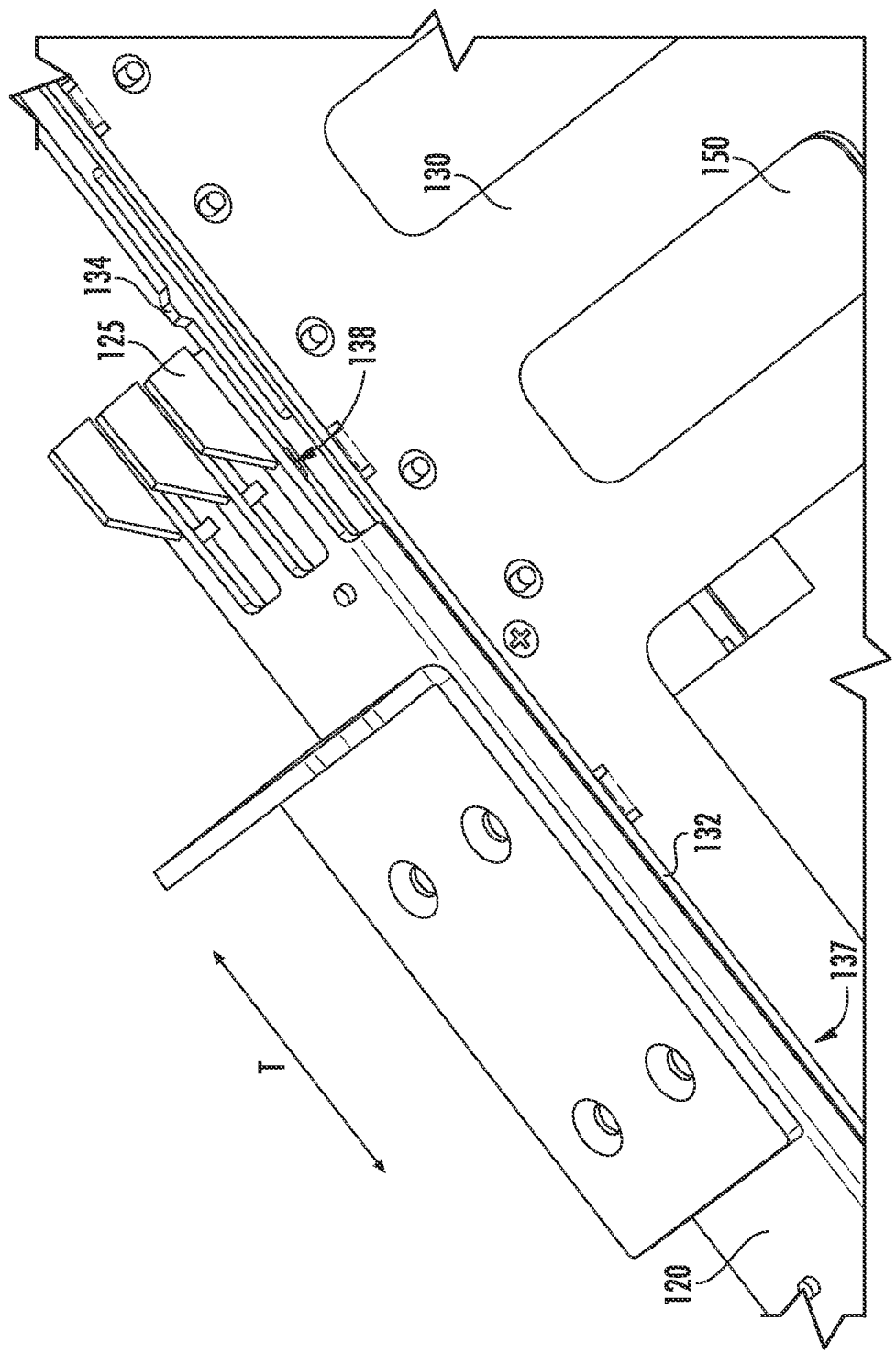

As noted above, slide rails 122 may be spaced apart along the vertical direction V such that tray 130 is slideable between slide rails 122. In particular, slide 132 of tray 130 may be positioned between slide rails 122 of tray support 120 in order to slidably mount tray 130 to tray support 120. Detent followers 134 can engage with first and second detents 124, 126 to hold tray 130 in either an extended position (FIGS. 5, 6 and 7) or a retracted position (FIG. 4). In particular, one of the detent followers 134 is received within first detent 124 of tray support 120 when tray 130 is in the extended position. The other of the detent followers 134 is not received within second detent 126 of tray support 120 and may be removed from between slide rails 122 of tray support 120 when tray 130 is in the extended position. In contrast, each of the detent followers 134 is received within a respective one of first and second detents 124, 126 when tray 130 is in the retracted position.

Detent followers 134 may be formed on a fixed beam or a cantilevered beam, and elastic deformation of the beam allows detent followers 134 to translate along the lateral direction L. Such motion of detent followers 134 allows detent followers 134 to extend into and retract out of first and second detents 124, 126 as a user slides tray 130 relative to tray support 120. In particular, detent followers 134 may deflect along the lateral direction L as tray 130 shifts between the extended position and the retracted position. In addition to holding tray 130 in either the retracted position or the extend position, detent followers 134 together with first and second detents 124, 126 may provide tactile feedback to the user regarding the position of the tray 130 on tray support 120. In particular, the user may feel when detent followers 134 enter first and second detents 124, 126 when the user adjusts tray 130 to the retracted position, and the user may feel when detent followers 134 exit first and second detents 124, 126 as the user adjusts tray 130 from the retracted position. Such tactile feedback can inform the user when to stop pushing or pulling on the tray 130.

As may be seen from the above, tray support 120 may cooperate with tray 130 to allow sliding of tray 130 along the transverse direction T relative to tray support 120. In general, the sliding tray mechanism functions as follows. Tray 130 has attached slides 132 that allow tray 130 to slide within slide rails 122 mounted to internal sides of enclosure 110. Slide rails 122 contain two detents. In the home or retracted position, both detents are engaged while only the front detent is utilized in the extended position. As the tray 130 is pulled forward from the retracted position, detent followers flex inward and afford a certain level of resistance until the rear detent follower aligns with the front detent in the extended position and locks in place.

Patch panel 100 also includes features for preventing or avoiding overextension of tray 130 from tray support 120. As shown in FIG. 2, tray support 120 includes a tray release lever 125 with a locking tab 127. Tray release lever 125 may be mounted to or formed with tray support base 128. In particular, tray release lever 125 may extend from tray support base 128 along the transverse direction T and/or may be cantilevered from tray support base 128 such that a distal end of tray release lever 125 may move along the vertical direction V relative to tray support base 128. Thus, tray release lever 125 may bend along the vertical direction V as tray 130 shifts between the extended position and the retracted position. In particular, tray release lever 125 may automatically bend upwardly along the vertical direction V as tray release lever 125 (e.g., locking tab 127) slides along an extended position ramp 171 at a front portion of slide 132. Tray release lever 125 engages tray 130 in the extended position of tray 130 to prevent overextension of tray 130 from tray support 120. In particular, tray 130 (e.g., slide 132 of tray 130) defines a tray locking slot 138. Locking tab 127 of tray release lever 125 is received within tray locking slot 138 when tray 130 is in the extended position. Thus, locking tab 127 of tray release lever 125 selectively holds tray 130 in the extended position.

Tray release lever 125 may ensure that tray 130 is not inadvertently removed or pulled passed the extended position. In general, tray locking slot 138 on tray 130 and locking tab 127 on tray release lever 125 interlock and work in concert to prevent tray 130 from being inadvertently removed or pulled passed the extended position. This is accomplished when slide 132 of tray 130 automatically lifts tray release lever 125 as tray 130 is pulled forward from the retracted positon until locking tab 127 aligns with tray locking slot 138 and falls into place and locks tray 130 in the extended position. If tray removal is desired, tray release lever 125 may be manually lifted in order to release locking tab 127 from tray locking slot 138. While in the extended position, tray 130 affords access to perform moves, adds, and/or changes with front side patch cords or to remove cassettes 150.

As shown in FIG. 15, tray locking slot 138 may include a sloped surface 139, e.g., at a rear portion of tray locking slot 138. Tray release lever 125 may automatically bend upwardly along the vertical direction V as tray release lever 125 (e.g., locking tab 127) slides along sloped surface 13 of tray locking slot 138. Thus, slide 132 of tray 130 may automatically lift tray release lever 125 from tray locking slot 138 as tray 130 is pushed backward from the extended position into the retracted positon. In alternative example embodiments, once locked in the extended position, tray release lever 125 may be manually lifted to allow tray 130 to be slid back into the retracted position.

Figure 14:
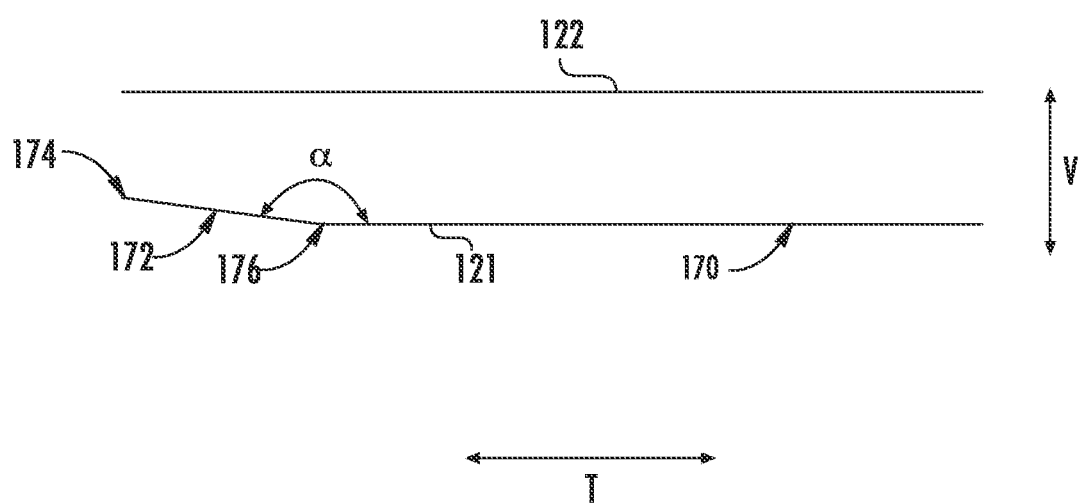
FIG. 14 is a partial, elevation view of the tray support of FIG. 2.

As may be seen in FIG. 14, a bottom slide rail 121 of slide rails 122 defines a support surface 170 and a sloped surface 172. Sloped surface 172 extends between a top portion 174 and a bottom portion 176 along the transverse direction T. Top portion 174 of sloped surface 172 is also positioned above or higher than bottom portion 176 of sloped surface 172 along the vertical direction V. Thus, top portion 174 and bottom portion 176 of sloped surface 172 are spaced from each other along the vertical direction V and the transverse direction T. Bottom portion 176 of sloped surface 172 is positioned at support surface 170, and top portion 174 of sloped surface 172 is positioned proximate tray release lever 125. Thus, sloped surface 172 extends upwardly along the vertical direction V from support surface 170 towards tray release lever 125.

Slide 132 of tray 130 rests on bottom slide rail 121 when tray 130 is in the retracted position, and slide 132 of tray 130 slides on bottom slide rail 121 as a user adjusts tray 130 from the retracted position towards the extended position. Support surface 170 may be generally flat and oriented horizontally. Thus, when tray 130 rests or slides on support surface 170, tray 130 may slide horizontally. In contrast, tray 130 may move upwardly along the vertical direction V when tray 130 slides on sloped surface 172. By urging tray 130 upwardly along the vertical direction V, sloped surface 172 may facilitate engagement of tray locking slot 138 on tray 130 with locking tab 127 on tray release lever 125. In particular, when tray 130 is in the extend position, the distal end of tray 130 may deflect or pivot downwardly along the vertical direction V less than when bottom slide rail 121 only includes the horizontal support surface 170.

The position and/or angle of sloped surface 172 may be selected to facilitate engagement of tray release lever 125 with slide 122, e.g., while not interfering with sliding of tray 130 on tray support 120. For example, a spacing between top portion 174 of sloped surface 172 and the top one of slide rails 122 may be less than a spacing between bottom portion 176 of sloped surface 172 and the top one of slide rails 122. As a more particular example, sloped surface 172 may define an angle α with support surface 170, e.g., in a plane that is perpendicular to the lateral direction L. The angle α may be less than one hundred and eighty degrees and greater than one hundred and seventy-five degrees. As another example, top portion 174 of sloped surface 172 may be spaced from bottom portion 176 of sloped surface 172 along the vertical direction V by no less than one micrometer and no more than one millimeter. A length of sloped surface 172 along the transverse direction T between top and bottom portions 174, 176 of sloped surface 172 may be no less than five millimeters and no greater than fifty millimeters, in certain example embodiments.

Figure 8:
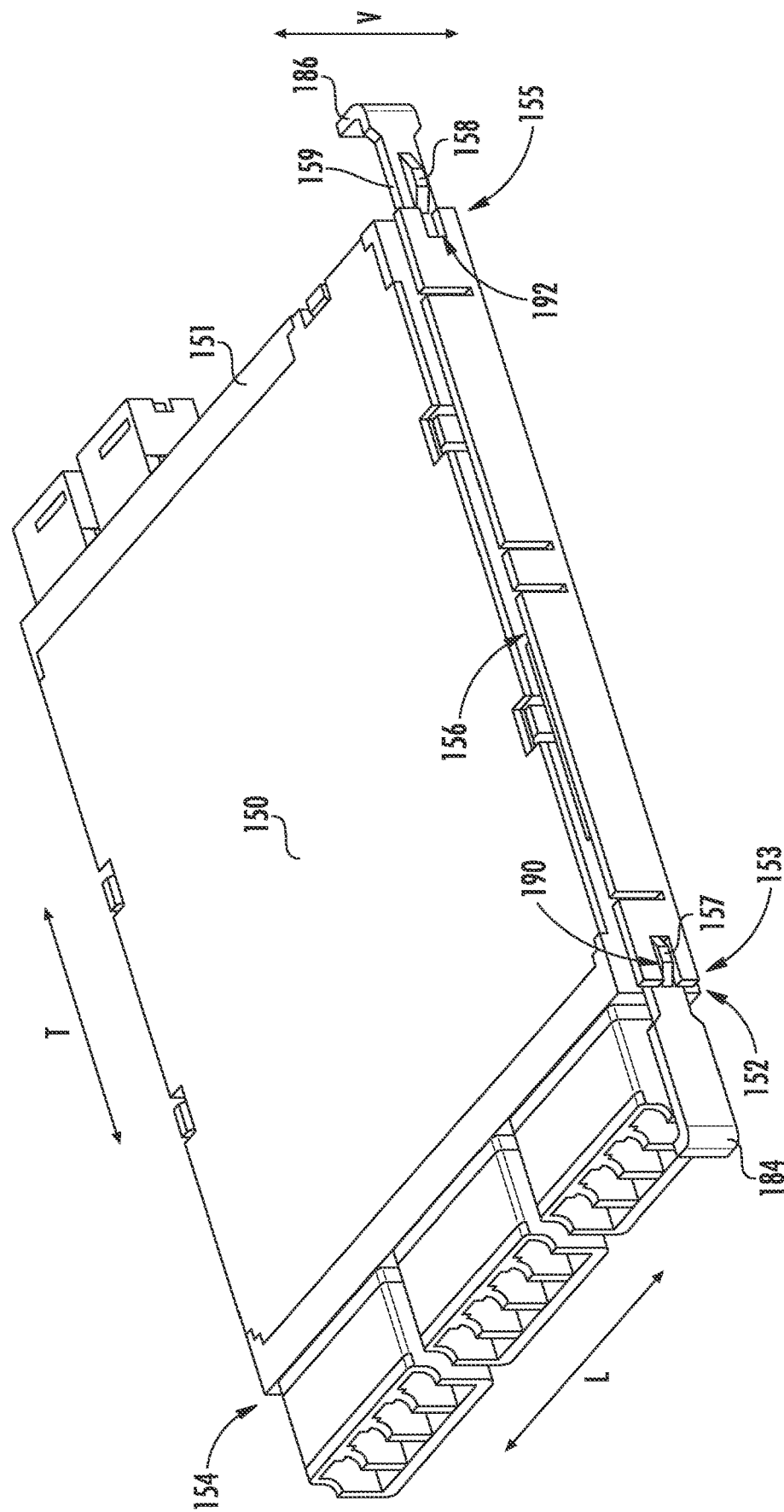
FIG. 8 is a perspective view of a cassette of the example patch panel of FIG. 1 with a release slide shown in a neutral position.
Figure 11:
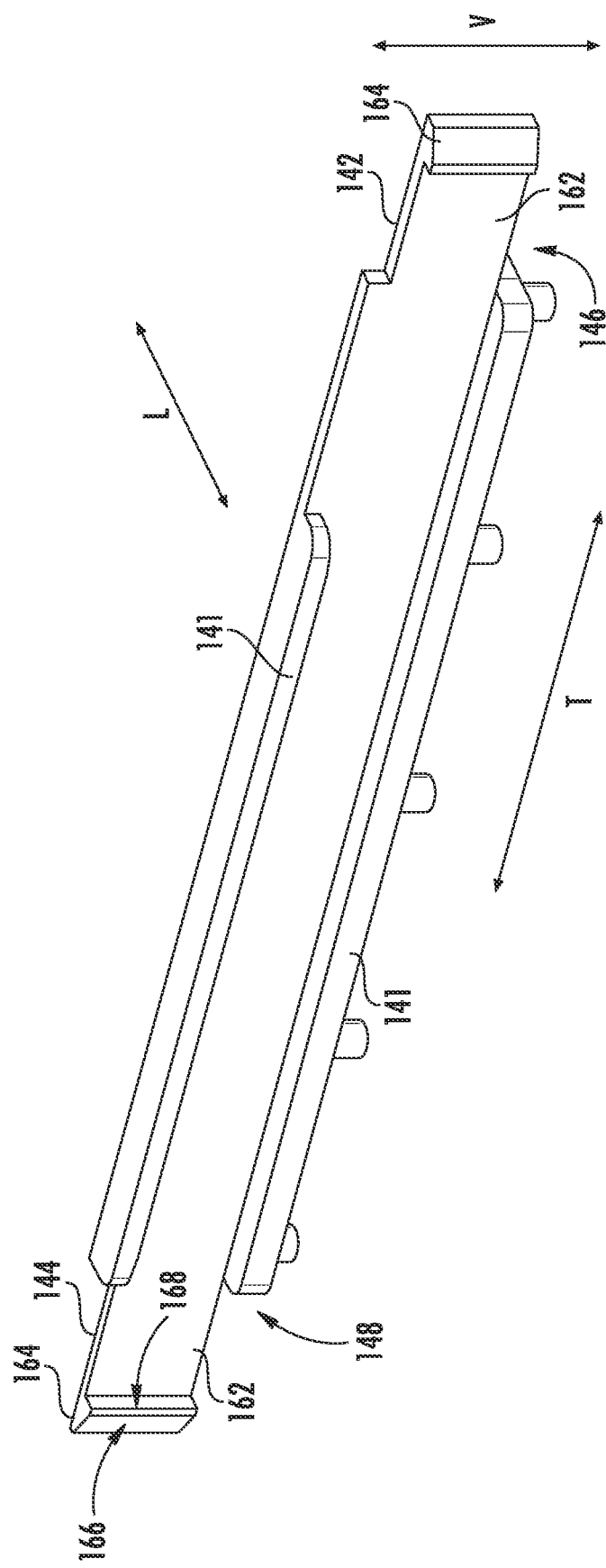
FIG. 11 is a perspective view of a cassette support of the example patch panel of FIG. 1.

FIG. 8 is a perspective view of one of cassettes 150, and FIG. 11 is a perspective view of one of cassette supports 140. In FIG. 11, only one of cassette supports 140 is shown. It will be understood that patch panel 100 may also include a plurality of additional cassette supports at various locations on trays 130, and the other cassette supports may be formed in the same or similar manner to cassette support 140 shown in FIG. 11. As shown in FIG. 1, tray 130 has a plurality of cassette mounting bays 160, and cassette supports 140 are mounted on tray 130 at cassette mounting bays 160 to provide a mounting structure for cassettes 150 in cassette mounting bays 160. Thus, patch panel 100 may include cassette supports 140 at opposite sides of each cassette mounting bay 160 along the lateral direction L. Cassette supports 140 may be mounted to tray 130 with thermal staking, ultrasonically welding, adhesive, tape and/or fasteners. In certain example, embodiments, cassette supports 140 may be mounted to tray 130 without fasteners, such as screws. One lateral side of each cassette 150 may be mounted to a respective cassette support 140 with latches as described in greater detail below, and the opposite lateral side of each cassette 150 may be slideably mounted to a respective cassette support 140, e.g., by a slide rail on cassette 150 received within a slot on the respective cassette support 140 or by sliding the cassette 150 between slide rails on the respective cassette support 140.

Turing back to FIG. 11, cassette support 140 may include a pair of slide rails 141. Slide rails 141 are spaced apart from each other along the vertical direction V. In particular, slide rails 141 may be spaced apart along the vertical direction V such that cassette 150 is slideable between slide rails 141. Thus, slide rails 141 may support cassette 150 such that cassette 150 is movable relative to tray 130 on cassette support 140. Cassette support 140 also has a first latch 142 and a second latch 144. First and second latches 142, 144 are each positioned at an opposite respective end portion of cassette support 140 along the transverse direction T. Thus, e.g., cassette support 140 may extend between a front portion 146 and a rear portion 148 along the transverse direction T. First latch 142 may be positioned at front portion 146 of cassette support 140, and second latch 144 may be positioned at rear portion 148 of cassette support 140. Slide rails 141 may be positioned between first and second latches 142, 144, e.g., along the transverse direction T. First and second latches 142, 144 may be configured to allow insertion of cassette 150 into cassette mounting bay 160 from a front 180 or a rear 182 of tray 130.

In example embodiments, first and second latches 142, 144 may be constructed in the same or similar manner as shown in FIG. 11. Thus, first latch 142 may be constructed according to the description provided below for second latch 144. As shown in FIG. 11, second latch 144 is cantilevered such that an arm 162 is elastically deformable and a catch 164 is moveable along the lateral direction L on the arm 162.

The catch 164 may include a sloped surface 166 and a locking surface 168 that face opposite each other along the transverse direction T.

Sloped surfaces 166 of first and second latches 142, 144 may assist with moving first and second latches 142, 144 to allow insertion of cassette 150 into cassette mounting bay 160. Locking surfaces 168 of first and second latches 142, 144 may assist with holding cassette 150 within cassette mounting bay 160. Thus, locking surface 168 of first latch 142 may engage a front of cassette 150 while locking surface 168 of second latch 144 may engage a rear of cassette 150 when cassette 150 is positioned within the cassette mounting bay 160. In such a manner, cassette 150 may be positioned between locking surfaces 168 of first and second latches 142, 144 along the transverse direction T when cassette 150 is positioned within the cassette mounting bay 160, and first and second latches 142, 144 may block movement of cassette 150 from cassette mounting bay 160.

When a user inserts cassette 150 into cassette mounting bay 160 from front 180 of tray 130, the cassette 150 may first impact sloped surface 166 of first latch 142, and cassette 150 may slide along sloped surface 166 of first latch 142 such that catch 164 of first latch 142 moves outwardly along the lateral direction L on arm 162 of first latch 142. Cassette 150 may then slide between slide rails 141 until cassette 150 is fully within cassette mounting bay 160 at which point catch 164 of first latch 142 moves inwardly along the lateral direction L on arm 162 of first latch 142. Locking surface 168 of first latch 142 may face and engage cassette 150 when cassette 150 is within cassette mounting bay 160.

Similarly, when a user inserts cassette 150 into cassette mounting bay 160 from rear 182 of tray 130, the cassette 150 may first impact sloped surface 166 of second latch 144, and cassette 150 may slide along sloped surface 166 of second latch 144 such that catch 164 of second latch 144 moves outwardly along the lateral direction L on arm 162 of second latch 144. Cassette 150 may then slide between slide rails 141 until cassette 150 is fully within cassette mounting bay 160 at which point catch 164 of second latch 144 moves inwardly along the lateral direction L on arm 162 of second latch 144. Locking surface 168 of second latch 144 may face and engage cassette 150 when cassette 150 is within cassette mounting bay 160.

Figure 9:
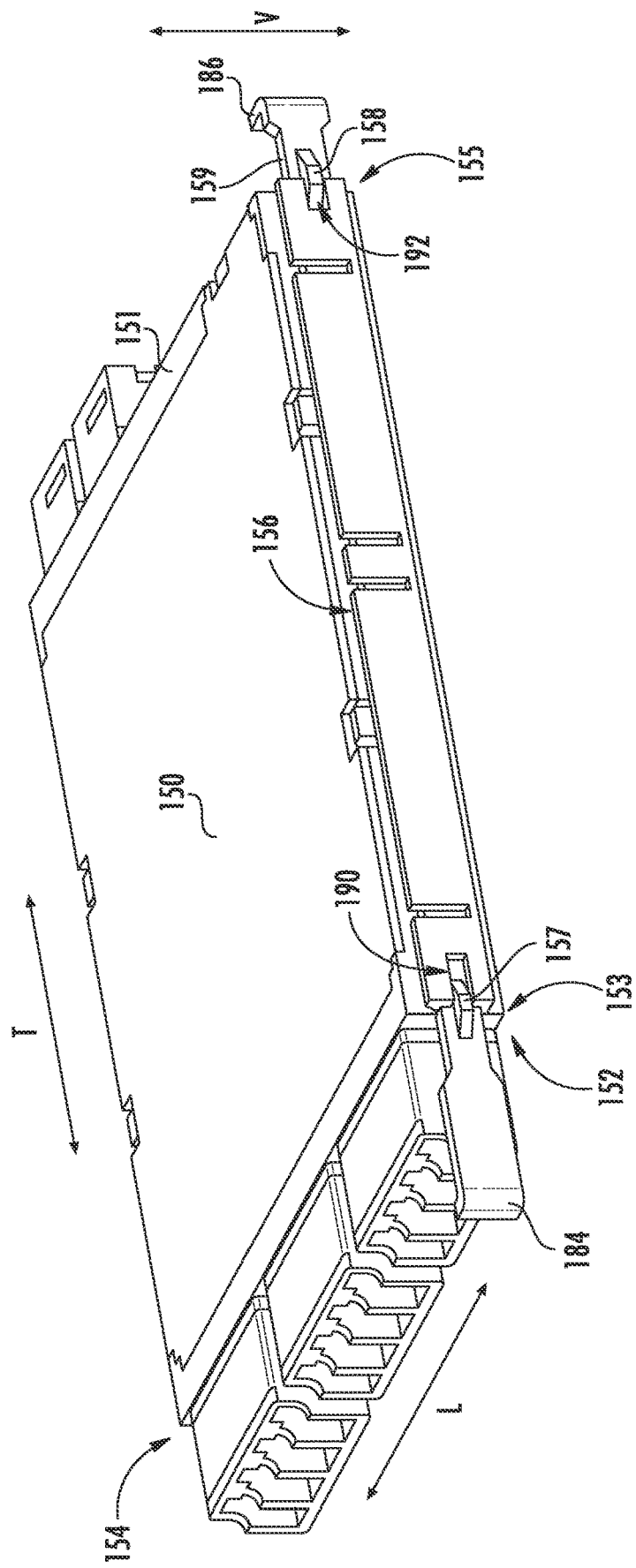
FIG. 9 is a perspective view of the cassette of FIG. 8 with the release slide shown in a release position.
Figure 10:
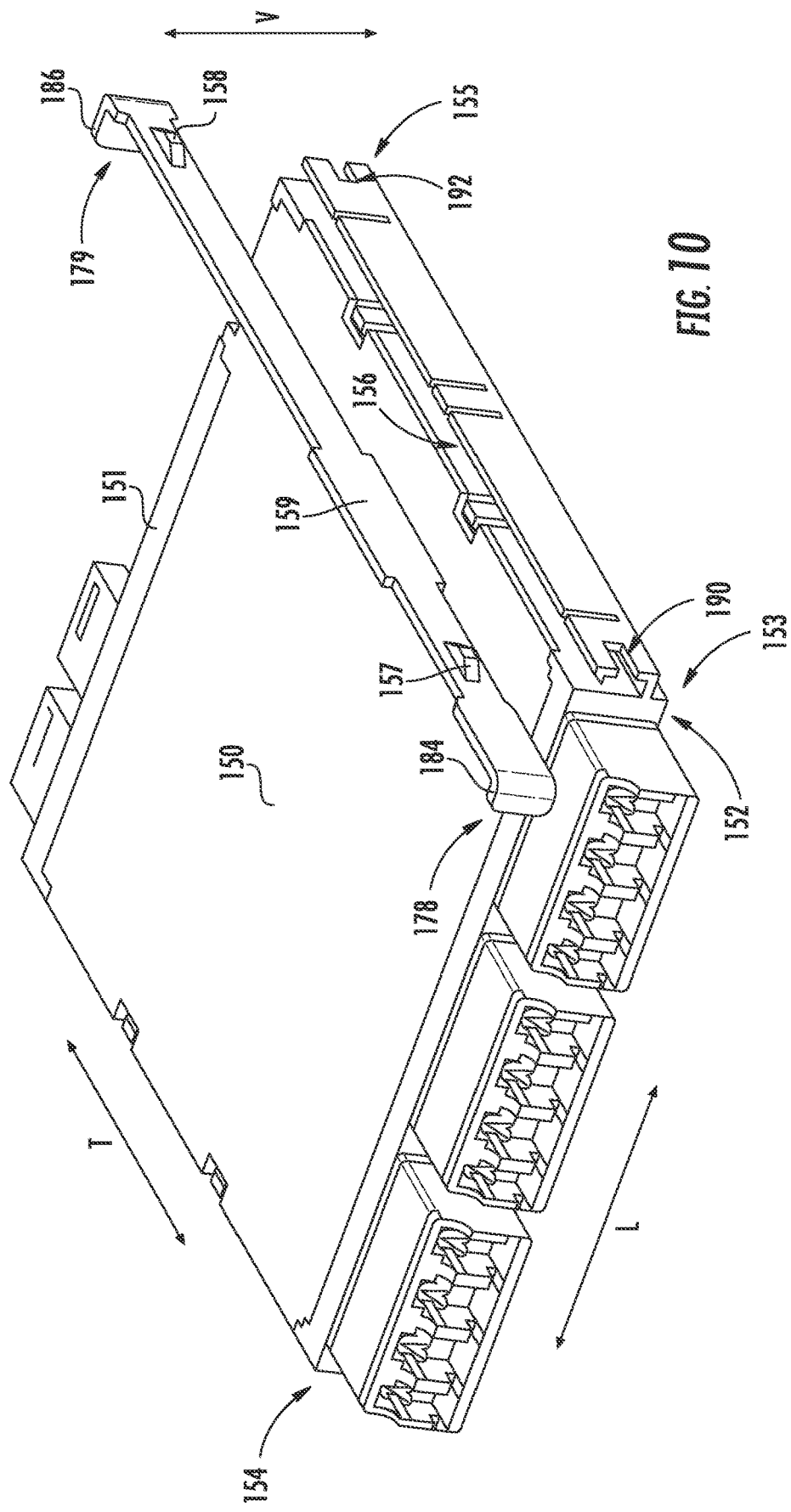
FIG. 10 is a partially exploded view of the cassette of FIG. 8.

Cassette 150 includes features for allowing removal cassette 150 from cassette mounting bay 160, e.g., by disengaging first and second latches 142, 144. As shown in FIGS. 8 through 10, cassette 150 includes a release slide 159. For example, a cassette body 151 of cassette 150 may extend between first side portion 152 and a second side portion 154 along the lateral direction L. Cassette body 151 may also extend between a front portion 153 and a rear portion 155 along the transverse direction T. Cassette body 151 may define a release slide slot 156 at the first side portion 152 of cassette body 151. Release slide slot 156 may extend longitudinally between front and rear portions 153, 155 of cassette body 151 along the transverse direction T. Release slide 159 is movable between a neutral (or locking) position and a release position within release slide slot 156.

Release slide 159 has a first ramp 157 and a second ramp 158. First and second ramps 157, 158 are each positioned at an opposite respective end portion of release slide 159 along the transverse direction T. For example, as shown in FIG. 10, release slide 159 may extend between a first end portion 178 and a second end portion 179 along the transverse direction T. First ramp 157 may be positioned proximate first end portion 178 of release slide 159, and second ramp 158 may be positioned proximate second end portion 179 of release slide 159.

Figure 12:
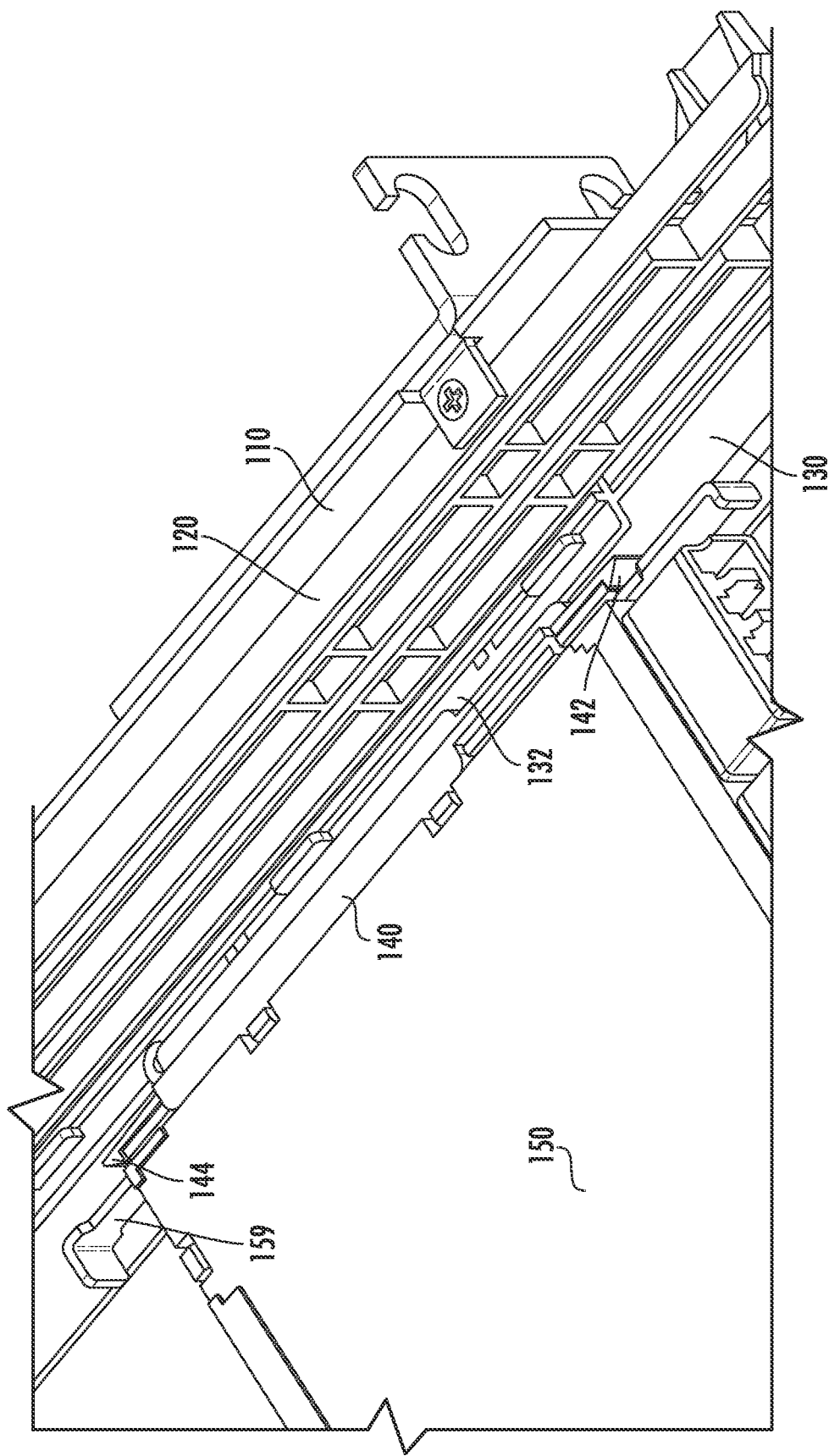
FIG. 12 is a perspective view of the cassette of FIG. 8 and the cassette support of FIG. 11.
Figure 13:
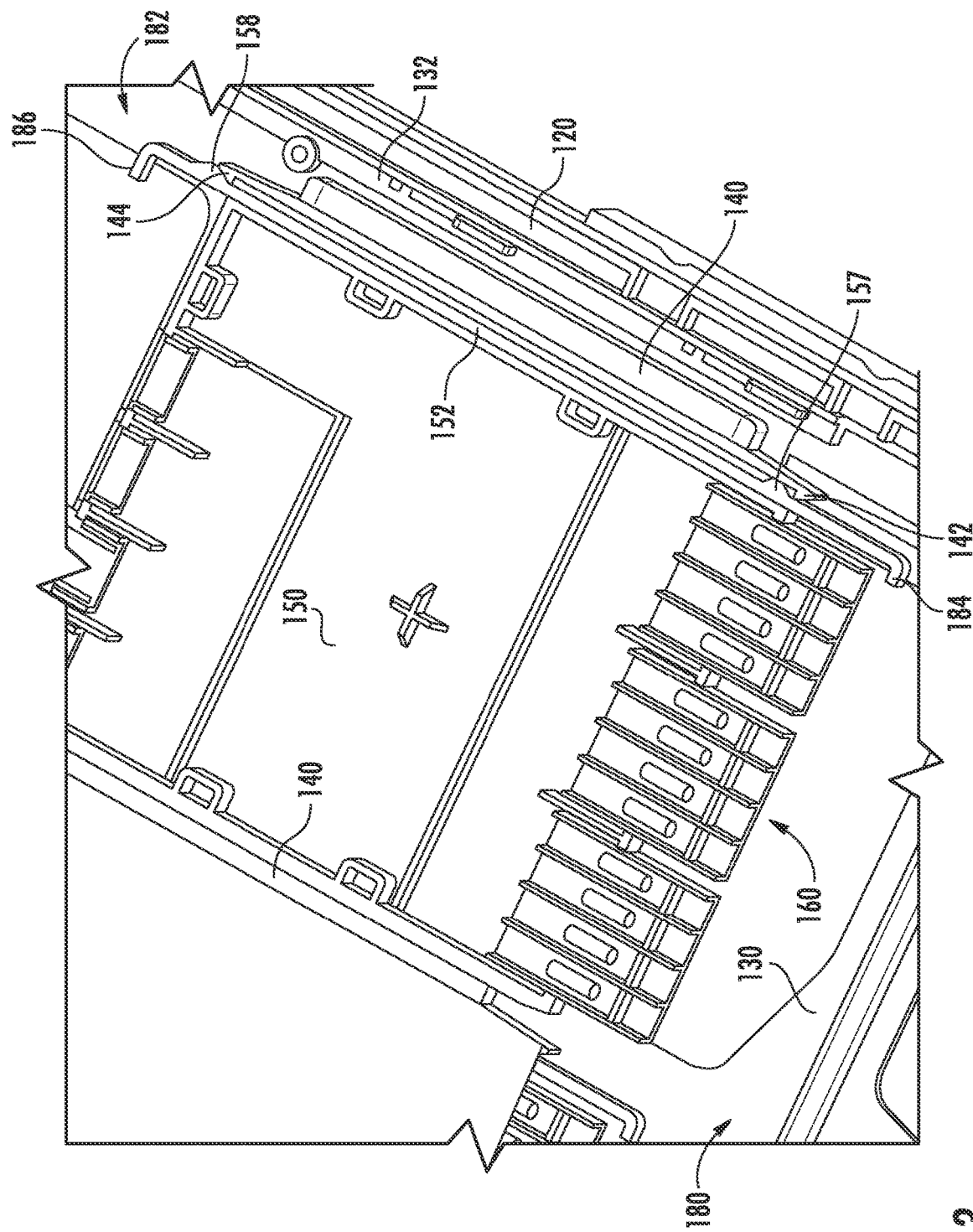
FIG. 13 is a section view of the cassette and cassette support of FIG. 12.

First and second ramps 157, 158 may assist with actuating first and second latches 142, 144 to allow removal of cassette 150 from cassette mounting bay 160. As shown in FIG. 12, first and second latches 142, 144 engage cassette 150 when cassette 150 is positioned within cassette mounting bay 160 and release slide 159 is in the neutral position. In contrast, when a user shifts release slide 159 to the release position, first ramp 157 may slide against and disengage first latch 142 from cassette 150 and/or second ramp 158 may slide against and disengage second latch 144 from cassette 150. In particular, sloped surfaces of first and second ramps 157, 158 may slide against and lift catches 164 of first and second latches 142, 144 such that catches 164 of first and second latches 142, 144 move outwardly along the lateral direction L away from cassette 150. Thus, the user may slide release slide 159 from the neutral position to the release position to simultaneously disengage first and second latches 142, 144 from cassette 150 and allow removal of cassette 150 from cassette mounting bay 160 at either front 180 of tray 130 or rear 182 of tray 130.

As shown in FIGS. 9 and 10, cassette body 151 defines a first ramp slot 190 and a second ramp slot 192 at first side portion 152 of cassette body 151. First ramp slot 190 may be positioned at front portion 153 of cassette body 151, and second ramp slot 192 may be positioned at rear portion 155 of cassette body 151. First ramp 157 is slidable into and from first ramp slot 190. When release slide 159 is in the neutral position, first ramp 157 is disposed within first ramp slot 190, e.g., such that first ramp 157 does not engage first latch 142. In contrast, as release slide 159 shifts from the neutral positon to the release position, first ramp 157 slides from first ramp slot 190 and engages first latch 142 in the manner described above. Second ramp 158 is slidable into and from second ramp slot 192. When release slide 159 is in the neutral position, second ramp 158 is disposed outside of second ramp slot 192, e.g., such that second ramp 158 does not engage second latch 144. In contrast, at least a portion of second ramp 158 is received within second ramp slot 192 when release slide 159 is in the release position. As release slide 159 shifts from the neutral positon to the release position, second ramp 158 slides into second ramp slot 192 and engages second latch 144 in the manner described above.

Release slide 159 may have a first handle 184 and a second handle 186. First handle 184 is positioned at first end portion 178 of release slide 159, and second handle 186 is positioned at second end portion 179 of release slide 159. Release slide 159 is manually shiftable between the locking and release positions with first and second handles 184, 186. Thus, a user may shift release slide 159 between the locking and release positions from front 180 of tray 130 with first handle 184 and from rear 182 of tray 130 with second handle 186. In the example embodiment shown in FIGS. 8 through 10, first handle 184 may be a pull handle, and second handle 186 may be a push handle. In alternative example embodiments, release slide 159 may be flipped on cassette 150 such that the position of first and second ramps 157, 158 is switched. In such example embodiments, first handle 184 may be a push handle, and second handle 186 may be a pull handle.

As may be seen from the above, cassette support 140 may cooperate with cassette 150 to allow sliding of cassette 150 along the transverse direction T relative to cassette support 140. Generally, the sliding cassette mechanism functions as follows. Cassette 150 has integral slides on both sides of cassette 150 that a received between slide rails 141 of cassette support 140. The side of cassette 150 with the locking mechanism may be larger in size to house release slide 159. Cassette supports 140 may only allow linear translation of cassette 150 along the transverse direction T (e.g., front to back and back to front).

As shown in FIG. 16, release slide 159 has a protrusion 188, e.g., proximate a middle portion of release slide 159. Protrusion 188 is engagable with one or more lips (not shown) on cassette body 151 within release slide slot 156. For example, protrusion 188 may contact the one or more lips on cassette body 151 such that interference between protrusion 188 and the one or more lips on cassette body 151 hinder release slide 159 from inadvertently shifting between the neutral position and the release position. Thus, protrusion 188 may assist with holding release slide 159 in a current one of the neutral position and the release position.

The present subject matter has numerous advantages over known high density fiber optic patch panels for pre-terminated cassette modules. For example, cassettes 150 may be installed and removed by single-hand manipulation for both front and rear install/release scenarios. In addition, the using adhesive tape and/or thermal staking to mount tray support 120 and/or cassette support 140 eliminates traditional fasteners saving space and assembly time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An enclosure comprising:
   a first tray support having a pair of slide rails spaced along the vertical direction;
   a second tray support having a pair of slide rails that are spaced along the vertical direction; and
   a tray having a plurality of cassette mounting bays, a first side portion, and a second side portion,
   wherein the first and second tray supports are disposed within the enclosure, and wherein the first side portion of the tray is receivable between the pair of slide rails of the first tray support and the second side portion of the tray is receivable between the pair of slide rails of the second tray support such that the tray is slidable along the first and second tray supports between a retracted position and a plurality of extended positions.

2. The enclosure of claim 1, wherein the first tray support comprises:
   a first detent and a second detent spaced apart from one another in a direction corresponding to a sliding direction of the tray; and
   a locking tab,
   wherein:
      the plurality of extended positions includes a first extended position and a second extended position,
      the first extended position corresponds to a position in which a detent follower of the first side portion of the tray interacts with the first detent, and
      the second extended position corresponds to a position in which a first tray locking slot of the first side portion of the tray interacts with the locking tab.

3. The enclosure of claim 2, wherein the locking tab is spaced apart from the first detent and the second detent in the direction corresponding to the sliding direction of the tray.

4. The enclosure of claim 2, wherein the locking tab is disposed on a tray release lever of the first tray support.

5. The enclosure of claim 2, wherein the first side portion of the tray further defines a second tray locking slot spaced apart from the first tray locking slot in the direction corresponding to the sliding direction of the tray, and wherein the second tray locking slot is disposed closer to a front side of the tray than the first tray locking slot.

6. The enclosure of claim 5, wherein the first and second tray locking slots are both disposed between the first and second detents.

7. The enclosure of claim 2, wherein the first and second detents are disposed on a lateral surface of the first side portion of the tray support, and wherein the first tray locking slot is disposed on a non-lateral surface of the first side portion of the tray support.

8. The enclosure of claim 2, wherein the second tray support comprises:
   a first detent and a second detent spaced apart from one another in a direction corresponding to a sliding direction of the tray; and
   a locking tab,
   wherein:
      the first extended position corresponds to a position in which a detent follower of the second side portion of the tray interacts with the first detent of the second tray support, and
      the second extended position corresponds to a position in which a first tray locking slot of the second side portion of the tray interacts with the locking tab of the second tray support.

9. The enclosure of claim 1, wherein the plurality of extended positions comprise a first extended position and a second extended position spaced apart from one another in a direction corresponding to a sliding direction of the tray.

10. An enclosure comprising:
    a first tray support disposed in the enclosure, the first tray support comprising:
       a pair of slide rails spaced along the vertical direction;
       a first detent and a second detent spaced apart from one another in a direction corresponding to a sliding direction of the tray; and
       a locking tab;
    a second tray support having a pair of slide rails that are spaced along the vertical direction; and
    a tray having a plurality of cassette mounting bays, a first side portion, and a second side portion,
    wherein the first side portion of the tray is receivable between the pair of slide rails of the first tray support and the second side portion of the tray is receivable between the pair of slide rails of the second tray support such that the tray is slidable along the first and second tray supports between a retracted position and a plurality of extended positions, wherein:
       the plurality of extended positions include a first extended position and a second extended position,
       the first extended position corresponds to a position in which a detent follower of the first side portion of the tray interacts with the first detent, and the second extended position corresponds to a position in which a first tray locking slot of the first side portion of the tray interacts with the locking tab.

11. The enclosure of claim 10, wherein the second tray support comprises:
a first detent and a second detent spaced apart from one another in a direction corresponding to a sliding direction of the tray; and
a locking tab,
wherein:
the first extended position corresponds to a position in which a detent follower of the second side portion of the tray interacts with the first detent of the second tray support, and
the second extended position corresponds to a position in which a first tray locking slot of the second side portion of the tray interacts with the locking tab of the second tray support.

12. The enclosure of claim 10, wherein the locking tab is spaced apart from the first detent and the second detent in the direction corresponding to the sliding direction of the tray.

13. The enclosure of claim 10, wherein the first and second tray locking slots are both disposed between the first and second detents.

14. The enclosure of claim 10, wherein the first and second detents are disposed on a lateral surface of the first side portion of the tray support, and wherein the first tray locking slot is disposed on a non-lateral surface of the first side portion of the tray support.

15. The enclosure of claim 10, wherein the locking tab is disposed on a tray release lever of the first tray support.

16. An enclosure comprising:
a first support having a pair of slide rails spaced along the vertical direction;
a second support having a pair of slide rails that are spaced along the vertical direction; and
a cassette disposed between a first side portion and a second side portion,
wherein the first and second supports are disposed within the enclosure, and wherein the first side portion is receivable between the pair of slide rails of the first support and the second side portion is receivable between the pair of slide rails of the second support such that the cassette is slidable along the first and second supports between a retracted position and a plurality of extended positions.

17. The enclosure of claim 16, wherein the plurality of extended positions comprise a first extended position and a second extended position spaced apart from one another in a direction corresponding to a sliding direction of the cassette.

18. The enclosure of claim 16, wherein the first side portion and the second side portion are part of a tray having a plurality of cassette mounting bays, and wherein the cassette is disposed within one of the cassette mounting bays.

19. The enclosure of claim 18, wherein the first support comprises:
a first detent and a second detent spaced apart from one another in a direction corresponding to a sliding direction of the cassette; and
a locking tab,
wherein:
the plurality of extended positions includes a first extended position and a second extended position,
the first extended position corresponds to a position in which a detent follower of the first side portion interacts with the first detent, and
the second extended position corresponds to a position in which a first locking slot of the first side portion interacts with the locking tab.

20. The enclosure of claim 19, wherein the locking tab is spaced apart from the first detent and the second detent in the direction corresponding to the sliding direction of the tray.

* * * * *